United States Patent
Osaka et al.

(10) Patent No.: US 12,490,123 B2
(45) Date of Patent: Dec. 2, 2025

(54) WIRELESS COMMUNICATION SYSTEM, WIRELESS COMMUNICATION METHOD, AND TRANSMITTER

(71) Applicant: NTT, Inc., Tokyo (JP)

(72) Inventors: Kazuo Osaka, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 353 days.

(21) Appl. No.: 18/273,795

(22) PCT Filed: Feb. 1, 2021

(86) PCT No.: PCT/JP2021/003575
§ 371 (c)(1),
(2) Date: Jul. 24, 2023

(87) PCT Pub. No.: WO2022/162945
PCT Pub. Date: Aug. 4, 2022

(65) Prior Publication Data
US 2024/0080683 A1    Mar. 7, 2024

(51) Int. Cl.
*H04W 24/04* (2009.01)
(52) U.S. Cl.
CPC .................................. *H04W 24/04* (2013.01)
(58) Field of Classification Search
CPC ...... H04W 24/04; H04W 72/04; H04W 88/04
See application file for complete search history.

(56) References Cited

U.S. PATENT DOCUMENTS

| | | | | |
|---|---|---|---|---|
| 2017/0041927 A1* | 2/2017 | Jeong | ................ | H04W 74/0891 |
| 2017/0079032 A1* | 3/2017 | Li | ...................... | H04W 74/0808 |
| 2017/0251494 A1* | 8/2017 | Li | ...................... | H04W 72/1215 |

(Continued)

FOREIGN PATENT DOCUMENTS

| | | |
|---|---|---|
| JP | S61-105128 A | 5/1986 |
| WO | 2015/067304 A1 | 5/2015 |

OTHER PUBLICATIONS

Hirofumi Ichikawa, "Research on Diversity System in Digital Wireless Communication", Osaka University Knowledge Archive, Available Online at: https://doi.org/10.11501/3178660, Jul. 31, 2000, pp. 1-159.

*Primary Examiner* — Syed Ali
(74) *Attorney, Agent, or Firm* — XSENSUS LLP (57) ABSTRACT

A wireless communication method according to one embodiment includes:

dividing the plurality of user signals into a plurality of frequency channels of an active system; distributing the plurality of divided user signals to the plurality of frequency channels of the active system;

transmitting the plurality of user signals distributed to the plurality of frequency channels of the active system for each of the plurality of frequency channels of the active system;

switching a frequency channel of the active system in which an abnormality occurs to a frequency channel of the redundant system when the abnormality occurs in one of the plurality of frequency channels of the active system in which the plurality of user signals are transmitted;

receiving the plurality of transmitted user signals for each frequency channel; and combining the plurality of user signals received for each frequency channel as a plurality of user signals for each user.

5 Claims, 7 Drawing Sheets

(56) References Cited

U.S. PATENT DOCUMENTS

2019/0182892 A1* 6/2019 Tsukamoto ............. H04W 4/10
2021/0345172 A1* 11/2021 Sugaya ................. H04W 28/06
2021/0385674 A1* 12/2021 Korneliussen ........ H04W 24/08
2022/0086838 A1* 3/2022 Sugaya ................. H04L 1/1854

* cited by examiner

WIRELESS COMMUNICATION SYSTEM, WIRELESS COMMUNICATION METHOD, AND TRANSMITTER

CROSS-REFERENCE TO RELATED APPLICATION

The present application is based on PCT filing PCT/JP2021/003575, filed Feb. 1, 2021, the entire contents of which are incorporated herein by reference.

TECHNICAL FIELD

The present invention relates to a wireless communication system, a wireless communication method, and a transmission device.

BACKGROUND ART

In wireless communication systems, there is known a technology for automatically switching an active frequency channel to a frequency channel of a redundant system (a standby system) when an active relay wireless device fails or when interference occurs in the active frequency channel and a line is disconnected.

For example, in frequency diversity of a digital microwave system, a system switching function for switching one system of which a line is disconnected to a standby system in units of systems among a plurality of active systems is known (for example, Non Patent Literature 1).

CITATION LIST

Non Patent Literature

Non Patent Literature 1: Ichikawa Hirofumi, "Research on Diversity System in Digital Wireless Communication," Osaka University Knowledge Archive, Jul. 31, 2000

SUMMARY OF INVENTION

Technical Problem

However, in the technology described in Non Patent Literature 1, since one user occupies one frequency channel and transmits a packet, there is a problem that all packets of one user are lost in an instantaneous interruption time involving switching to a redundant system regardless of priority of the packets.

The present invention has been devised in view of the above-described problem and an objective of the present invention is to provide a wireless communication system, a wireless communication method, and a transmission device capable of switching a frequency channel to a frequency channel of a redundant system while reducing user signals that are lost per user when an abnormality occurs in the frequency channel of an active system.

Solution to Problem

According to an aspect of the present invention, in a wireless communication system, a plurality of user signals are transmitted from a transmission device to a reception device using a plurality of frequency channels including an active system and a redundant system. The transmission device includes a division and distribution unit that divides the plurality of user signals into a plurality of frequency channels of the active system and distributes the plurality of divided user signals to the plurality of frequency channels of the active system, a transmission unit that transmits the plurality of user signals distributed to the plurality of frequency channels of the active system by the division and distribution unit to the reception device for each of the plurality of frequency channels of the active system, and a switching unit that switches a frequency channel of the active system in which an abnormality occurs to a frequency channel of the redundant system when the abnormality occurs in one of the plurality of frequency channels of the active system in which the transmission unit transmits the plurality of user signals. The reception device includes a reception unit that receives the plurality of user signals transmitted by the transmission unit for each frequency channel, and a combination unit that combines the plurality of user signals received by the receiving unit for each frequency channel as a plurality of user signals for each user According to another aspect of the present invention, a wireless communication method of transmitting a plurality of user signals using a plurality of frequency channels including an active system and a redundant system includes: a division and distribution step of dividing the plurality of user signals into a plurality of frequency channels of the active system and distributing the plurality of divided user signals to the plurality of frequency channels of the active system; a transmission step of transmitting the plurality of user signals distributed to the plurality of frequency channels of the active system for each of the plurality of frequency channels of the active system; a switching step of switching a frequency channel of the active system in which an abnormality occurs to a frequency channel of the redundant system when the abnormality occurs in one of the plurality of frequency channels of the active system in which the plurality of user signals are transmitted; a reception step of receiving the plurality of transmitted user signals for each frequency channel; and a combination step of combining the plurality of user signals received for each frequency channel as a plurality of user signals for each user.

According to still another aspect of the present invention, a transmission device transmits a plurality of user signals to a reception device using a plurality of frequency channels including an active system and a redundant system. The transmission device includes: a division and distribution unit that divides the plurality of user signals into a plurality of frequency channels of the active system and distributes the plurality of divided user signals to the plurality of frequency channels of the active system; a transmission unit that transmits the plurality of user signals distributed to the plurality of frequency channels of the active system by the division and distribution unit to the reception device for each of the plurality of frequency channels of the active system, and a switching unit that switches a frequency channel of the active system in which an abnormality occurs to a frequency channel of the redundant system when the abnormality occurs in one of the plurality of frequency channels of the active system in which the transmission unit transmits the plurality of user signals.

Advantageous Effects of Invention

According to the present invention, when an abnormality occurs in the frequency channel of the active system, the frequency channel can be switched to a frequency channel of the redundant system while reducing user signals that are lost per user.

BRIEF DESCRIPTION OF DRAWINGS

FIG. 3(a) is a diagram schematically illustrating a plurality of user signals before division transmitted by the transmission device and a FIG. 3(b) is a diagram schematically illustrating a plurality of user signals after division and distribution transmitted by the transmission device.

DESCRIPTION OF EMBODIMENTS

Figure 1:
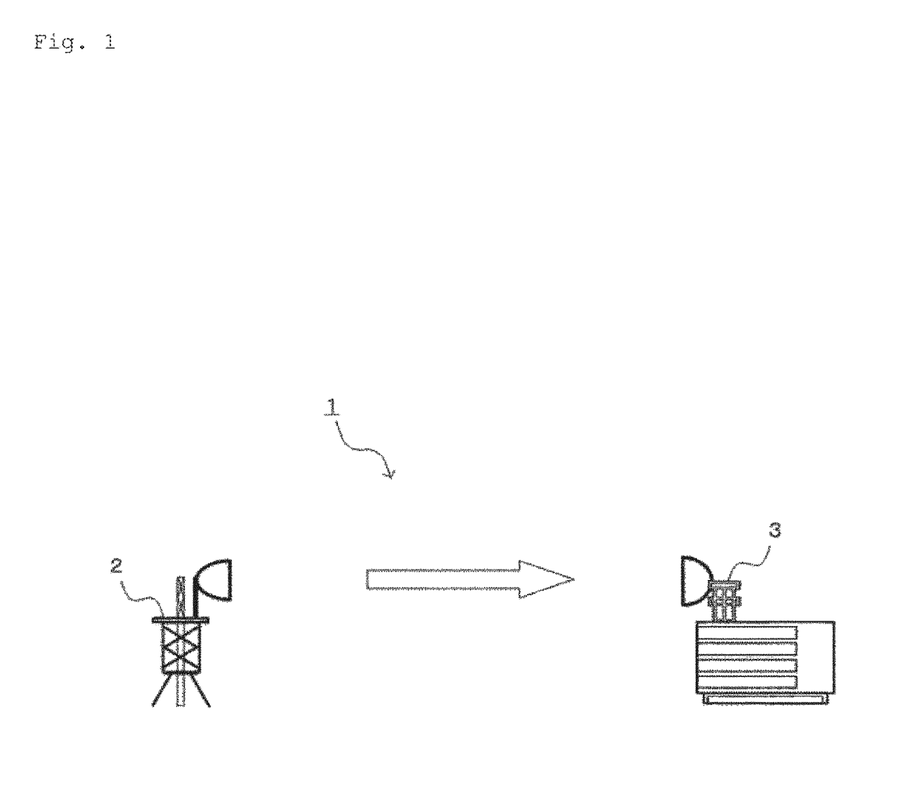
FIG. 1 is a diagram illustrating a configuration of a wireless communication system according to an embodiment of the present invention.

Hereinafter, an embodiment of a wireless communication system will be described with reference to the drawings. FIG. 1 is a diagram illustrating an example of a configuration of a wireless communication system 1 according to the embodiment. As illustrated in FIG. 1, the wireless communication system 1 includes a transmission device 2 and a reception device 3. The transmission device 2 and the reception device 3 perform wireless communication such as microwave band land fixed communication.

For example, the transmission device 2 transmits a plurality of user signals to the reception device 3 by using a plurality of frequency channels including an active system and a redundant system. It is assumed that the transmission device 2 and the reception device 3 have functions of transmitting and receiving a plurality of user signals to and from each other and can each operate as a relay wireless device.

Figure 2:
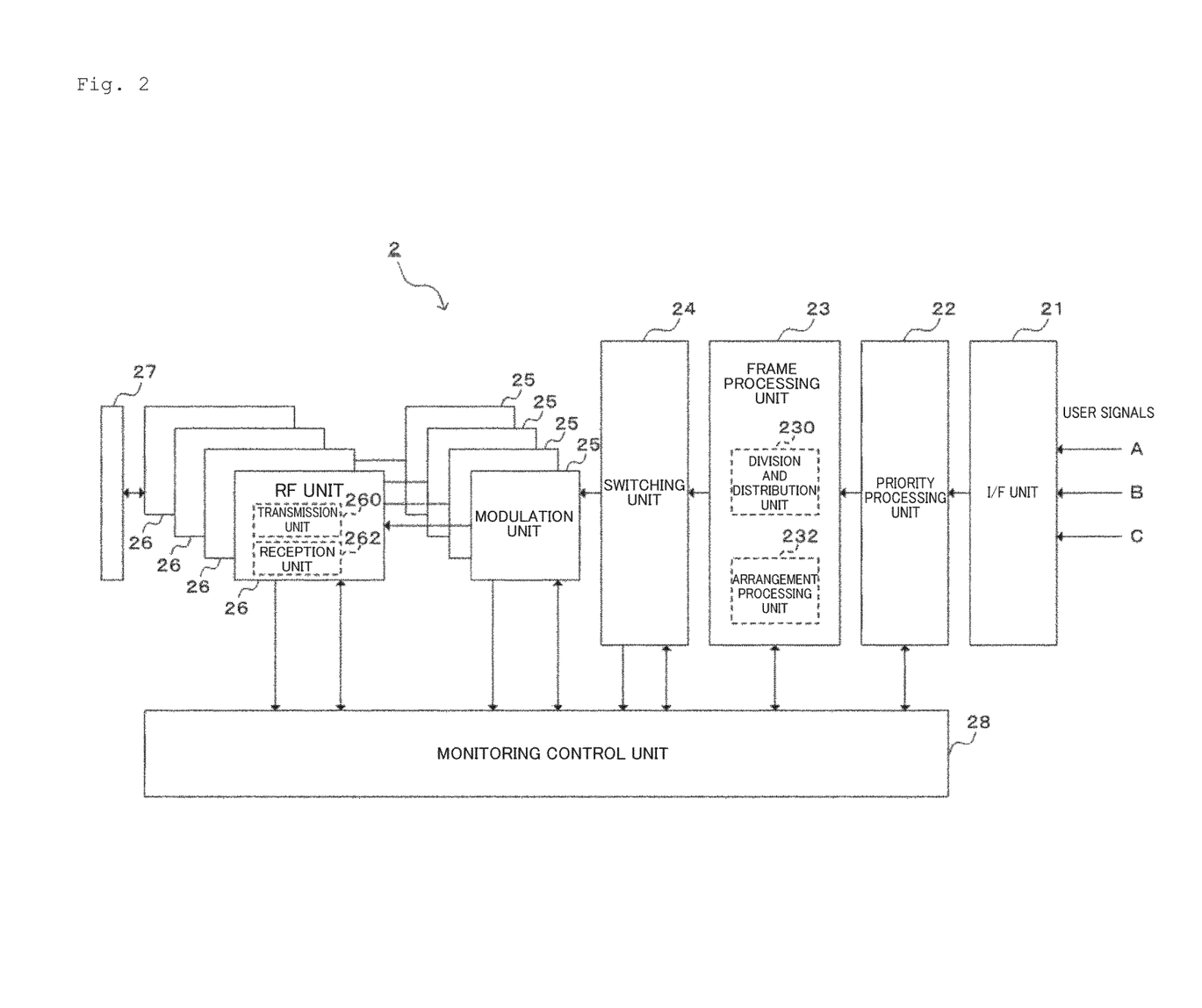
FIG. 2 is a functional block diagram illustrating functions of a base station according to the embodiment.

FIG. 2 is a functional block diagram illustrating functions of the transmission device 2 according to one embodiment. As shown in FIG. 2, the transmission device 2 includes, for example, an interface (I/F) unit 21, a priority processing unit 22, a frame processing unit 23, a switching unit 24, four modulation units 25 corresponding to the frequency channels, four radio frequency (RF) units 26 corresponding to the frequency channels, an antenna 27, and a monitoring control unit 28.

The I/F unit 21 is a user interface that acquires, for example, three user signals A, B, and C and outputs the user signals A, B, and C to the priority processing unit 22. The user signals A, B, and C are, for example, signals output by three different user terminals (not illustrated), and include data of different categories such as calls, moving images, text, files, photographs, and the like.

The priority processing unit 22 performs processing for identifying a priority of each of the user signals output by the I/F unit 21 and outputs the processed user signals to the frame processing unit 23. For example, the priority processing unit 22 processes the priority of each user signal similarly to quality of services (QoS) control defined in IEEE802.11e.

The frame processing unit 23 includes a division and distribution unit 230 and an arrangement processing unit 232, performs buffering, data distribution, and mapping, and the like on the user signals output by the priority processing unit 22 to generate a predetermined frame, and outputs the generated frame to the switching unit 24.

The division and distribution unit 230 divides each of the plurality of user signals into a plurality of frequency channels of the active system and distributes the plurality of divided user signals to the plurality of frequency channels of the active system.

The arrangement processing unit 232 processes the plurality of user signals as signals in which a high priority packet is arranged between low priority packets. The arrangement processing unit 232 arranges the signals as high priority packets for each category of the user signals or for each user.

That is, the transmission device 2 controls the priority of the user signals by performing enhanced distributed channel access (EDCA) for transmitting a frame of a category with high priority first, hybrid coordination function controlled channel access (HCCA) for allocating a dedicated band to a frame with high priority (specific user signal or the like), or the like.

When an abnormality occurs in one of a plurality of frequency channels of the active system in which the RF unit 26 transmits the plurality of user signals, the switching unit 24 performs processing for switching the frequency channel of the active system in which the abnormality occurs to a frequency channel of the redundant system. Then, the switching unit 24 outputs the processed user signals to four modulation units 25 for each frequency channel. The switching unit 24 has a function of outputting a warning to the monitoring control unit 28 when an abnormality occurs in any of the plurality of frequency channels of the active system.

Each modulation unit 25 modulates the user signal output by the switching unit 24 for each frequency channel and outputs the modulated user signal to the RF unit 26. Each of the modulation units 25 has a function of outputting a warning to the monitoring control unit 28 when an abnormality occurs in the frequency channel of the active system.

Each RF unit 26 has a transmission unit 260 and a reception unit 262. The transmission unit 260 transmits the user signal modulated by the modulation unit 25 by, for example, time division multiplexing for each frequency channel via the antenna 27.

More specifically, the transmission unit 260 transmits each of the plurality of user signal packets distributed to the plurality of frequency channels of the active system by the division and distribution unit 230 to the reception device 3 for each of the plurality of frequency channels of the active system.

The reception unit 262 receives a signal transmitted by the reception device 3 via the antenna 27 and outputs the signal to the monitoring control unit 28. Each RF unit 26 has a function of outputting a warning to the monitoring control unit 28 when an abnormality occurs in the frequency channel of the active system.

The monitoring control unit 28 monitors whether abnormality occurs in the frequency channel of the active system and controls each unit included in the transmission device 2. For example, the monitoring control unit 28 detects a failure in the transmission device 2 or the reception device 3, an abnormality in the frequency channel of the active system, and the like and the switching unit 24 performs control such that the frequency channel of the active system is switched to the frequency channel of the redundant system. The monitoring control unit 28 performs control such that the priority processing unit 22 processes the priority of each user signal.

Figure 3:
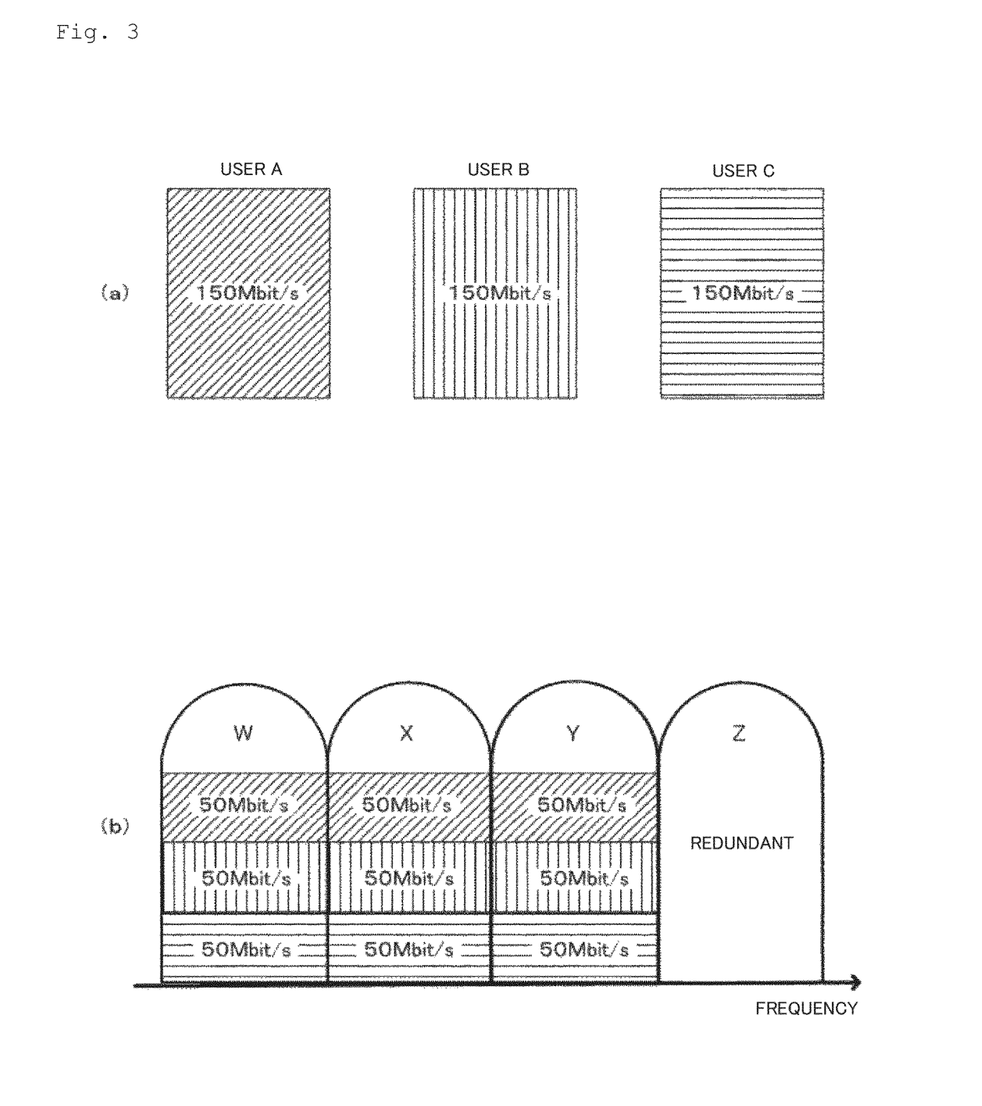

FIG. 3 is a diagram schematically illustrating a plurality of user signals transmitted by the transmission device 2.

FIG. 3(*a*) is a diagram schematically illustrating a plurality of user signals before division transmitted by the transmission device 2 and a FIG. 3(*b*) is a diagram schematically illustrating a plurality of user signals after division and distribution transmitted by the transmission device 2.

As illustrated in FIG. 3(*a*), the transmission device 2 transmits each of the user signals of the user signals A, B, and C, for example, with a contract band (a transmission capacity) of 150 Mbit/s. Specifically, as illustrated in FIG. 3(*b*), the transmission device 2 divides and distributes three user signals for three frequency channels W, X, and Y of the active system equally (for example, 50 Mbit/s each) and simultaneously transmits the user signals to the reception device 3. The frequency channel Z is a redundant frequency channel. At this time, the transmission device 2 has a queue for each class based on the priority of the user signals and transmits a high priority packet between low priority packets for the plurality of frequency channels.

Figure 4:
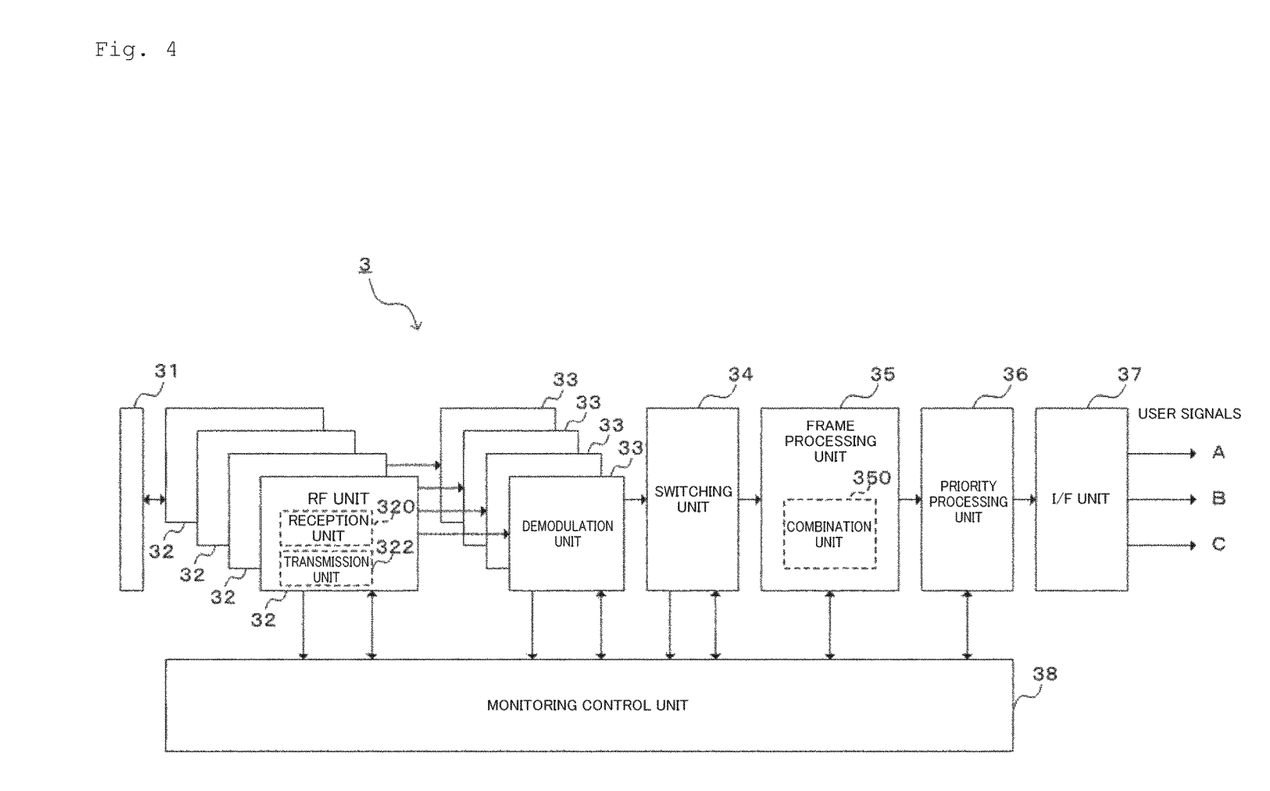
FIG. 4 is a functional block diagram illustrating the functional units of a reception device according to the embodiment.

FIG. 4 is a functional block diagram illustrating the functional units of a reception device 3 according to the embodiment. As illustrated in FIG. 4, the reception device 3 includes, for example, an antenna 31, four radio frequency (RF) units 32 corresponding to frequency channels, four demodulation units 33 corresponding to frequency channels, a switching unit 34, a frame processing unit 35, a priority processing unit 36, an interface (I/F) unit 37, and a monitoring control unit 38.

Each communication unit 32 includes a reception unit 320 and a transmission unit 322. The reception unit 320 receives each of the user signals transmitted by the transmission device 2 for each frequency channel via the antenna 31 and outputs the received user signals to the demodulation unit 33. The reception unit 320 outputs the signal transmitted by the transmission device 2 to the monitoring control unit 28. The transmission unit 322 transmits a transmission signal to the transmission device 2 via the antenna 31. Each RF unit 32 has a function of outputting a warning to the monitoring control unit 38 when an abnormality occurs in the frequency channel of the active system.

Each demodulation unit 33 demodulates the user signal received by the RF unit 32 for each frequency channel and outputs the demodulated user signal to the switching unit 34. Each demodulation unit 33 has a function of outputting a warning to the monitoring control unit 38 when an abnormality occurs in the frequency channel of the active system.

When an abnormality occurs in any of a plurality of frequency channels of the active system for transmitting the plurality of user signals demodulated by the demodulation units 33, the switching unit 34 performs processing for switching a frequency channel of the active system in which the abnormality occurs to the frequency channel of the redundant system. Then, the switching unit 34 outputs the processed user signal to the frame processing unit 35 for each frequency channel. The switching unit 34 has a function of outputting a warning to the monitoring control unit 38 when an abnormality occurs in any of the plurality of frequency channels of the active system.

The frame processing unit 35 includes a combination unit 350, and performs buffering, data coupling (combination), and demapping on the user signal output by the switching unit 34 to generate a predetermined frame, and outputs the generated frame to a priority processing unit 36.

The combination unit 350 combines the plurality of user signals received by the RF units 32 for each frequency channel as a plurality of user signals for each user to generate frames.

The priority processing unit 36 performs processing for identifying the priority of each user signal outputted by the frame processing unit 35 and outputs the processed user signal to the I/F unit 37. For example, the priority processing unit 36 processes the priority of each user signal similarly to QoS control prescribed in IEEE 802.11e.

The I/F unit 37 is a user interface that acquires, for example, three user signals A, B, and C output by the priority processing unit 36 and outputs the user signals A, B, and C to a subsequent stage.

The monitoring control unit 38 monitors whether an abnormality occurs in the frequency channel of the active system and controls each unit included in the reception device 3. For example, the monitoring control unit 38 detects a failure in the transmission device 2 or the reception device 3, an abnormality in the frequency channel of the active system, and the like, and controls the switching unit 34 to switch the frequency channel of the active system to the frequency channel of the redundant system. The monitoring control unit 38 performs control such that the priority processing unit 36 processes the priority of each user signal.

That is, the reception device 3 simultaneously receives the plurality of user signals transmitted through a plurality of frequency channels and combines traffic of each user divided into a plurality of users to generate a contract band of each user.

A function of each of the above-described transmission device 2 and reception device 3 may be partially or entirely configured with hardware such as a programmable logic device (PLD) or field programmable gate array (FPGA) or may be constituted as a program executed by a processor such as a CPU.

For example, the transmission device 2 and the reception device 3 according to the embodiment can be implemented using a computer and a program, and the program can be recorded on a storage medium or be provided through a network.

Figure 5:
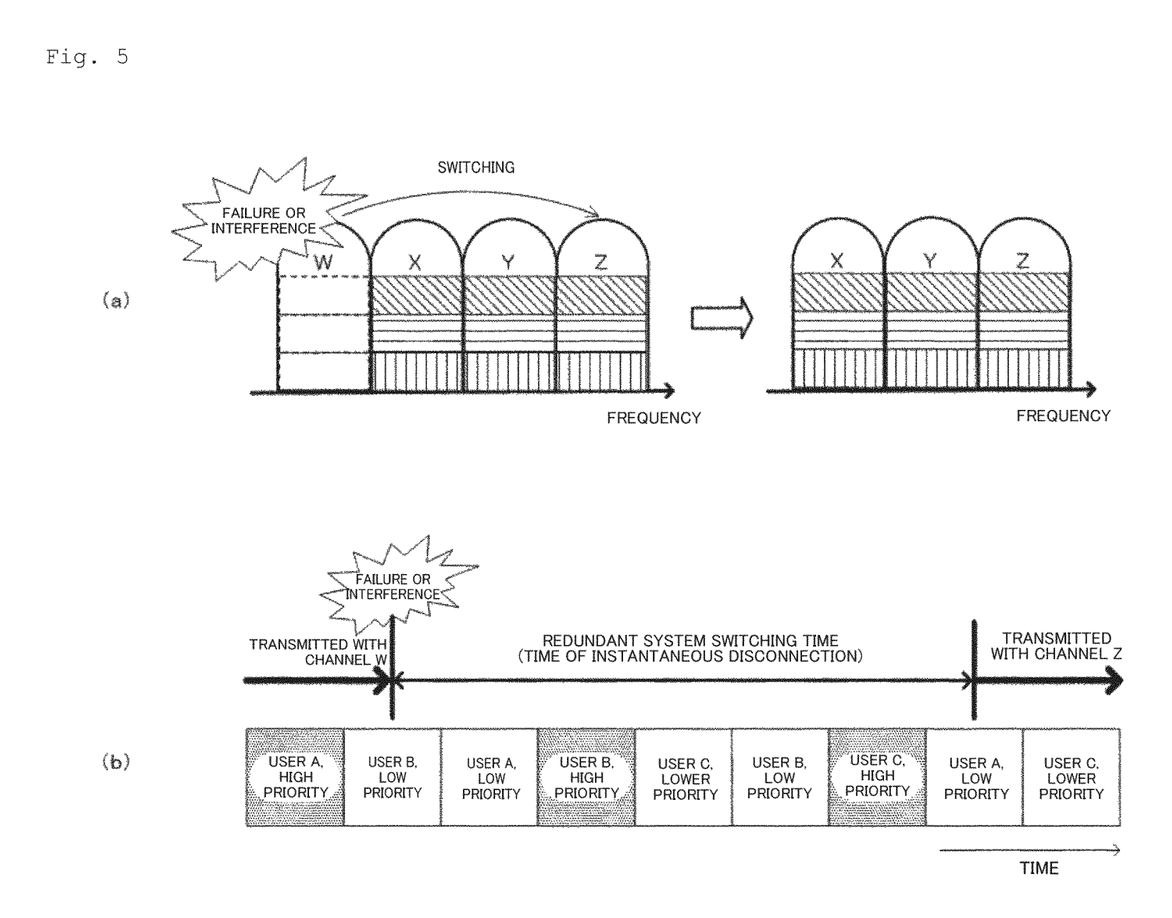
FIG. 5(a) is a diagram schematically illustrating a frequency channel to be switched by the wireless communication system and FIG. 5(b) is a diagram schematically illustrating user signals transmitted by the wireless communication system.

Next, a first operation example of the wireless communication system 1 will be described. FIG. 5 is a diagram schematically illustrating user signals (see FIG. 3) in a first operation example of the wireless communication system 1. FIG. 5(*a*) is a diagram schematically illustrating frequency channels to be switched in the wireless communication system 1. FIG. 5(*b*) is a diagram schematically illustrating the user signals (arrangement of the packets) transmitted in the wireless communication system 1.

As illustrated in FIG. 5(*a*), when a line disconnection occurs due to a device failure or radio wave interference in any (for example, the frequency channel W) of the frequency channels W, X, and Y of the active system. The frequency channel W of the active system is switched to the frequency channel Z of the redundant system.

At this time, as illustrated in FIG. 5(*b*), the wireless communication system 1 loses a high priority packet of the user B and a high priority packet of the user C which are put between the low priority packets of the plurality of users at the time of redundant system switching from the frequency channel W to the frequency channel Z (the time of instantaneous disconnection). The high priority packet is a user signal of which a category is, for example, a call. The low priority packet is a user signal of which a category is, for example, a moving image.

As described above, the wireless communication system 1 according to one embodiment can switch the frequency channel of the active system in which an abnormality (a failure or the like) occurs to the frequency channel of the redundant system while further reducing the user signal that is lost per user than in the case where one user occupies one frequency channel and transmits a packet. The wireless communication system 1 can further reduce the number of packets with high priority to be discarded than the case where one user occupies one frequency channel and transmits packets, and thus it is possible to improve reliability of a communication line.

Figure 6:
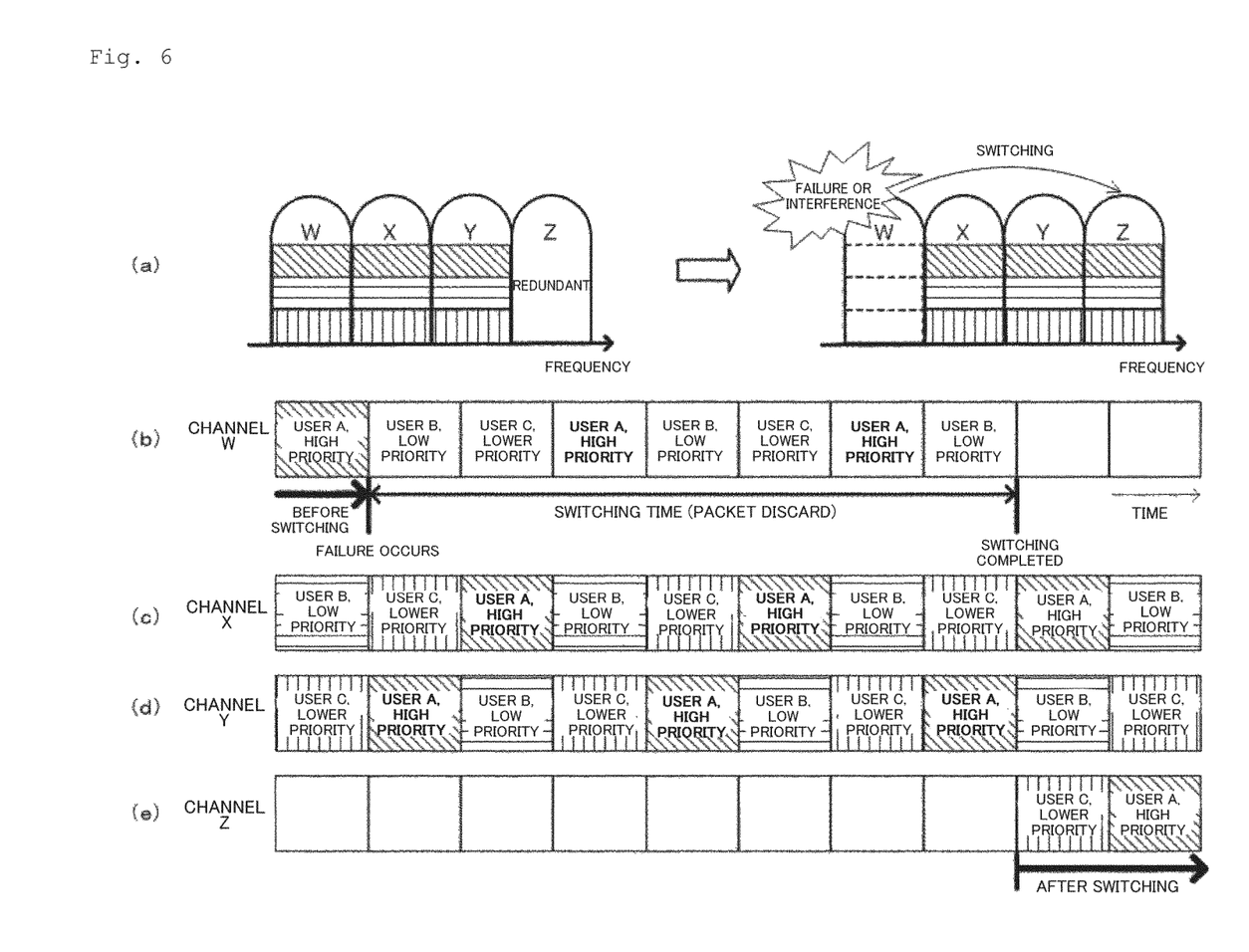
FIG. 6(a) is a diagram schematically illustrating a frequency channel switched by the wireless communication system.
FIG. 6(b) is a diagram schematically illustrating user signals transmitted with a frequency channel W by the wireless communication system.
FIG. 6(c) is a diagram schematically illustrating user signals transmitted with a frequency channel X by the wireless communication system.
FIG. 6(d) is a diagram schematically illustrating user signals transmitted with a frequency channel Y by the wireless communication system.
FIG. 6(e) is a diagram schematically illustrating user signals transmitted with a frequency channel Z by the wireless communication system.

Next, a second operation example of the wireless communication system 1 will be described. FIG. 6 is a diagram schematically illustrating user signals (see FIG. 3) in a second operation example of the wireless communication system 1.

FIG. 6(*a*) is a diagram schematically illustrating a frequency channel switched by the wireless communication system 1, FIG. 6(*b*) is a diagram schematically illustrating user signals (arrangement of the packets) transmitted with a frequency channel W by the wireless communication system 1, FIG. 6(*c*) is a diagram schematically illustrating user signals (arrangement of the packets) transmitted with a frequency channel X by the wireless communication system 1, FIG. 6(*d*) is a diagram schematically illustrating user signals (arrangement of the packets) transmitted with a frequency channel Y by the wireless communication system 1, and FIG. 6(*e*) is a diagram schematically illustrating user signals (arrangement of the packets) transmitted with a frequency channel Z by the wireless communication system 1.

As illustrated in FIG. 6 *a*, when a line disconnection occurs due to a device failure or radio wave interference in any (for example, the frequency channel W) of the frequency channels W, X, and Y of the active system. The frequency channel W of the active system is switched to the frequency channel Z of the redundant system.

At this time, the wireless communication system 1, as illustrated in FIG. 6(*b*), user signals (a plurality of high priority packets and low priority packets) are discarded in the frequency channel W. The high priority packet is, for example, a user signal of the user A. The low priority packets are, for example, user signals of users B and C. Specifically, the high priority packet of the user A put between the low priority packets of the plurality of users is lost in the frequency channel W.

As illustrated in FIG. 6(*c*), the low priority packets of the plurality of users and the high priority packets of the user A are all transmitted with the frequency channel X. As illustrated in FIG. 6(*d*), the low priority packets of the plurality of users and the high priority packets of the user A are all transmitted with the frequency channel Y.

Then, as illustrated in FIG. 6(*e*), the low priority packets after switching and the high priority packet of the user A are all transmitted with the frequency channel Z of the redundant system.

As described above, the wireless communication system 1 according to the embodiment can switch the frequency channel of the active system in which an abnormality (a failure or the like) occurs to the frequency channel of the redundant system while further reducing the user signal that is lost per user than in the case where one user occupies one frequency channel and transmits a packet. The wireless communication system 1 can further reduce the number of packets with high priority to be discarded than the case where one user occupies one frequency channel and transmits packets, and thus it is possible to improve reliability of a communication line.

The wireless communication system 1 can be applied to Ethernet (registered trademark) for a corporation user and can reduce an influence of instantaneous disconnection occurring in route switching when a relay wireless section fails. The wireless communication system 1 is also applicable to fixed wireless access (FWA), millimeter wave band communication, quasi-millimeter wave band communication, and mobile communication.

Figure 7:
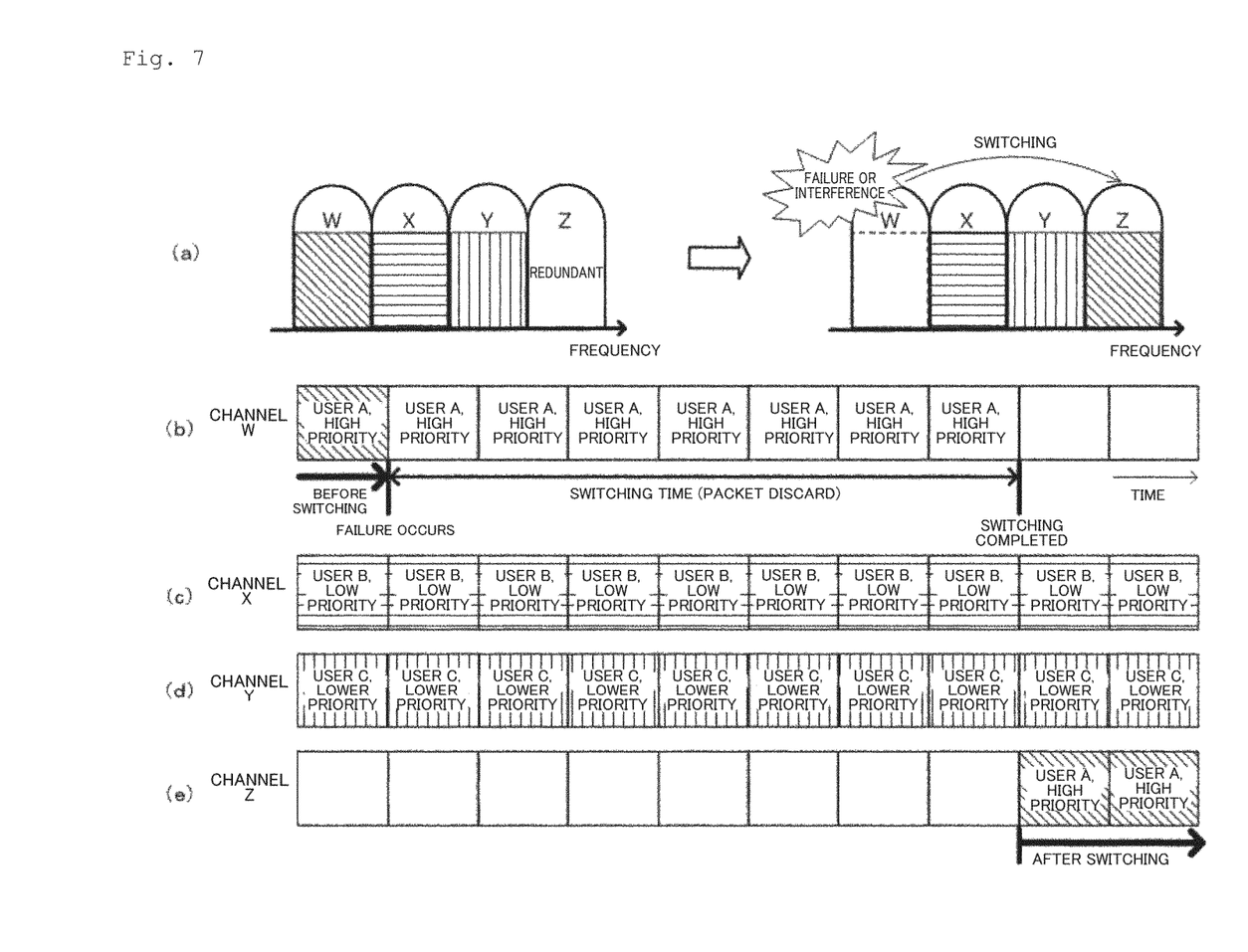
FIG. 7(a) is a diagram schematically illustrating a frequency channel switched by a wireless communication system according to a comparative example.
FIG. 7(b) is a diagram schematically illustrating user signals transmitted with the frequency channel W by the wireless communication system according to the comparative example.
FIG. 7(c) is a diagram schematically illustrating user signals transmitted with the frequency channel X by the wireless communication system according to the comparative example.
FIG. 7(d) is a diagram schematically illustrating user signals transmitted with the frequency channel Y by the wireless communication system according to the comparative example.
FIG. 7(e) is a diagram schematically illustrating user signals transmitted with the frequency channel Z by the wireless communication system according to the comparative example.

Next, switching of frequency channels in a wireless communication system according to a comparative example and user signals (arrangement of packets) transmitted by the plurality of frequency channels will be described. FIG. 7 is a diagram schematically illustrating switching of frequency channels and user signals (arrangement of packets) transmitted by a plurality of frequency channels in the wireless communication system according to the comparative example.

FIG. 7(*a*) is a diagram schematically illustrating a frequency channel switched by a wireless communication system according to a comparative example, FIG. 7(*b*) is a diagram schematically illustrating user signals (arrangement of the packets) transmitted with the frequency channel W by the wireless communication system according to the comparative example, FIG. 7(*c*) is a diagram schematically illustrating user signals (arrangement of the packets) transmitted with the frequency channel X by the wireless communication system according to the comparative example, FIG. 7(*d*) is a diagram schematically illustrating user signals (arrangement of the packets) transmitted with the frequency channel Y by the wireless communication system according to the comparative example, and FIG. 7(*e*) is a diagram schematically illustrating user signals (arrangement of the packets) transmitted with the frequency channel Z by the wireless communication system according to the comparative example.

As shown in FIG. 7(a), the wireless communication system according to the comparative example switches the frequency channel W of the active system to the frequency channel Z of the redundant system when a line disconnection due to a device failure or radio wave interference occurs in any of the frequency channels W, X, and Y of the active system, For example, the frequency channel W of the active system is switched to the frequency channel Z of the redundant system.

In the wireless communication system according to the comparative example, the user A occupies the frequency channel W, the user B occupies the frequency channel X, and the user C occupies the frequency channel Y to transmit the packets.

At this time, the wireless communication system according to the comparative example, as illustrated in FIG. 7(b), the user signal is discarded in the frequency channel W. The high priority packet is, for example, a user signal of the user A. The low priority packets are, for example, user signals of users B and C. That is, all the high priority packets of the user A in a switching time are lost in the frequency channel W.

As illustrated in FIG. 7(c), the low priority packets of the user B are all transmitted with the frequency channel X. As illustrated in FIG. 7(d), the low priority packets of the user C are all transmitted with the frequency channel Y.

Then, as illustrated in FIG. 7(e), the high priority packets of the user A after the switching are all transmitted with the frequency channel Z of the redundant system.

As described above, in the wireless communication system according to the comparative example, when a line disconnection occurs in the frequency channel W, the high priority packets of the user A are all lost during the switching time, and the reliability of the communication line may deteriorate.

REFERENCE SIGNS LIST

1 Wireless communication system
2 Transmission device
3 Reception device
21 I/F unit
22 Priority processing unit
23 Frame processing unit
24 Switching unit
25 Modulation unit
26 RF unit
27 Antenna
28 Monitoring control unit
31 Antenna
32 RF unit
33 Demodulation unit
34 Switching unit
35 Frame processing unit
36 Priority processing unit
37 I/F unit
38 Monitoring control unit
230 Division and distribution unit
232 Arrangement processing unit
260 Transmission unit
262 Reception unit
320 Reception unit
322 Transmission unit
350 Combination unit

The invention claimed is:

1. A wireless communication system in which a plurality of user signals are transmitted from a transmission device to a reception device using a plurality of frequency channels including an active system and a redundant system, the wireless communication system comprising:
the transmission device that includes
division and distribution circuitry that divides the plurality of user signals into a plurality of frequency channels of the active system and distributes the plurality of divided user signals to the plurality of frequency channels of the active system,
a transmitter that transmits the plurality of user signals distributed to the plurality of frequency channels of the active system by the division and distribution circuitry to the reception device for each of the plurality of frequency channels of the active system, and
a switch that switches a frequency channel of the active system in which an abnormality occurs to a frequency channel of the redundant system when the abnormality occurs in one of the plurality of frequency channels of the active system in which the transmitter transmits the plurality of user signals,
wherein the reception device includes a receiver that receives the plurality of user signals transmitted by the transmitter for each frequency channel,
combination circuitry that combines the plurality of user signals received by the receiver for each frequency channel as a plurality of user signals for each user, and
wherein the transmission device further includes arrangement processing circuitry that processes the signals transmitted by the transmitter for each frequency channel as signals in which high priority packets are arranged between low priority packets.

2. The wireless communication system according to claim 1, wherein the arrangement processing circuitry arranges the signals for each user as high priority packets for each category of the user signal or for each user.

3. A wireless communication method of transmitting a plurality of user signals using a plurality of frequency channels including an active system and a redundant system, the method comprising:
dividing the plurality of user signals into a plurality of frequency channels of the active system and distributing the plurality of divided user signals to the plurality of frequency channels of the active system;
transmitting the plurality of user signals distributed to the plurality of frequency channels of the active system for each of the plurality of frequency channels of the active system;
switching a frequency channel of the active system in which an abnormality occurs to a frequency channel of the redundant system when the abnormality occurs in one of the plurality of frequency channels of the active system in which the plurality of user signals are transmitted;
receiving the plurality of transmitted user signals for each frequency channel;
combining the plurality of user signals received for each frequency channel as a plurality of user signals for each user; and
processing signals to be transmitted for each frequency channel to become signals in which high priority packets are arranged between low priority packets.

4. A transmission device transmitting a plurality of user signals to a reception device using a plurality of frequency channels including an active system and a redundant system, the transmission device comprising:

division and distribution circuitry that divides the plurality of user signals into a plurality of frequency channels of the active system and distributes the plurality of divided user signals to the plurality of frequency channels of the active system,     a transmitter that transmits the plurality of user signals distributed to the plurality of frequency channels of the active system by the division and distribution circuitry to the reception device for each of the plurality of frequency channels of the active system;

a switch that switches a frequency channel of the active system in which an abnormality occurs to a frequency channel of the redundant system when the abnormality occurs in one of the plurality of frequency channels of the active system in which the transmitter transmits the plurality of user signals; and     arrangement processing circuitry that processes the signals transmitted by the transmitter for each frequency channel as signals in which high priority packets are arranged between low priority packets.

5. The transmission device according to claim 4, wherein the arrangement processing circuitry arranges the signals for each user as high priority packets for each category of the user signal or for each user.

\* \* \* \* \*